(12) United States Patent
Laakso et al.

(10) Patent No.: US 9,211,791 B2
(45) Date of Patent: Dec. 15, 2015

(54) AUTOMOBILE OVER-BULKHEAD AIR INTAKE SYSTEM

(71) Applicant: Honda Motor Co., Ltd., Tokyo (JP)

(72) Inventors: Brandy Kay Laakso, Marysville, OH (US); Charles Orwig, Marysville, OH (US); David S. Bates, Marysville, OH (US); David M. Edwards, Marysville, OH (US); Erich Bauer, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/230,424

(22) Filed: Mar. 31, 2014

(65) Prior Publication Data

US 2015/0274003 A1 Oct. 1, 2015

(51) Int. Cl.
*B60K 13/02* (2006.01)

(52) U.S. Cl.
CPC ..................................... *B60K 13/02* (2013.01)

(58) Field of Classification Search
CPC ........ B60K 13/02; B60K 11/08; B60K 11/00; B60K 11/04
USPC ................................. 180/68.1–68.4
See application file for complete search history.

(56) References Cited

U.S. PATENT DOCUMENTS

| | | | |
|---|---|---|---|
| 4,420,057 A | 12/1983 | Omote et al. | |
| 5,417,177 A * | 5/1995 | Taguchi et al. | 440/12.5 |
| 5,564,513 A * | 10/1996 | Wible et al. | 180/68.3 |
| 6,056,075 A | 5/2000 | Kargilis | |
| 6,276,482 B1 * | 8/2001 | Moriya et al. | 180/229 |
| 6,302,228 B1 * | 10/2001 | Cottereau et al. | 180/68.1 |
| 6,626,483 B2 | 9/2003 | Ozawa et al. | |
| 6,880,655 B2 * | 4/2005 | Suwa et al. | 180/68.1 |
| 7,273,121 B2 | 9/2007 | Kino et al. | |
| 7,303,042 B2 | 12/2007 | Kanehira et al. | |
| 7,469,762 B2 | 12/2008 | Kim | |
| 7,523,798 B2 | 4/2009 | Muramatsu | |
| 7,717,204 B2 | 5/2010 | Kondou et al. | |
| 8,028,782 B2 | 10/2011 | Goda et al. | |
| 8,056,664 B2 | 11/2011 | Laakso | |
| 8,100,209 B2 | 1/2012 | Goldsberry | |
| 8,205,699 B2 | 6/2012 | Ohzono et al. | |
| 8,439,143 B2 | 5/2013 | Leanza et al. | |
| 8,474,558 B2 | 7/2013 | Ohira et al. | |
| 8,485,295 B2 | 7/2013 | Mildner | |
| 8,540,043 B2 * | 9/2013 | Mehlos | F02M 35/161 180/68.1 |
| 8,590,651 B2 | 11/2013 | Shigematsu | |

* cited by examiner

*Primary Examiner* — John Walters
*Assistant Examiner* — James Triggs
(74) *Attorney, Agent, or Firm* — Rankin, Hill & Clark LLP

(57) ABSTRACT

A vehicle air intake system includes a grille disposed along the front portion of an engine compartment, a hood disposed over the engine compartment, and an air intake enclosure disposed over a bulkhead extending laterally across the engine compartment. The intake enclosure has an intake port. A bulkhead cover is disposed in the engine compartment below the hood for covering the bulkhead. The bulkhead cover has an upper part and a lower part. The upper part is sealingly engaged to both the intake port and the lower part. The lower part defines a bulkhead cover intake port. An airflow path extends from the grille through the bulkhead cover intake port and to the air intake enclosure intake port. The airflow path is defined by the grille and the bulkhead cover.

18 Claims, 5 Drawing Sheets

AUTOMOBILE OVER-BULKHEAD AIR INTAKE SYSTEM

BACKGROUND

Air intake systems provide necessary air to internal combustion engines to aid in the combustion process. Conventional intake systems either draw air from inside the engine compartment, or they draw air from outside the vehicle via an exterior intake port. Systems designed where the air is drawn from inside the engine compartment commonly suffer a drawback of drawing in warmer and less dense air than exterior air. This reduces the efficiency of the engine compared with the use of cooler exterior air. A solution to address the shortcoming of these systems is to draw in cooler exterior air. However, systems designed where the air is drawn in via an exterior intake port commonly suffer a drawback of drawing in air that includes water or particles, which can block the engine intake, inhibit airflow, or damage the engine. Some solutions have been proposed to address the shortcomings of these exterior intake port systems.

BRIEF DESCRIPTION

In accordance with one aspect, a vehicle air intake system comprises a grille disposed along the front portion of an engine compartment, a hood disposed over the engine compartment, and an air intake enclosure disposed over a bulkhead extending laterally across the engine compartment. The intake enclosure has an intake port. A bulkhead cover is disposed in the engine compartment below the hood for covering the bulkhead. The bulkhead cover has an upper part and a lower part. The upper part is sealingly engaged to both the intake port and the lower part. The lower part defines a bulkhead cover intake port. An airflow path extends from the grille through the bulkhead cover intake port and to the air intake enclosure intake port. The airflow path is defined by the grille and the bulkhead cover In accordance with another aspect, an air intake system for a vehicle comprises a grille disposed along the front portion of the engine compartment and having apertures therein for receiving airflow. A hood is disposed over the engine compartment. A bulkhead cover received in the engine compartment below the hood covers a bulkhead extending laterally across the engine compartment. An air guide separate from the bulkhead cover is located below the bulkhead cover. The bulkhead cover and the air guide define an enclosed airflow passage for receiving airflow flowing through the apertures of the grille. An air intake enclosure is disposed over the bulkhead. The air intake enclosure has an intake port in direct fluid communication with the airflow passage.

In accordance with yet another aspect, a vehicle air intake bulkhead cover comprises an upper part for covering a bulkhead extending laterally across the engine compartment and a lower part separate from the upper part. The lower part includes a base wall extending over the bulkhead, a pair of opposing sidewalls extending upwardly from the base wall, a rearward wall extending obliquely downwardly from the base wall, and a forward wall spaced apart from the rearward wall and having a screen which extends transverse to an airflow path. The upper part is sealingly engaged to the sidewalls and the forward wall of the lower part to define an enclosed airflow passage.

DETAILED DESCRIPTION

Figure 1:
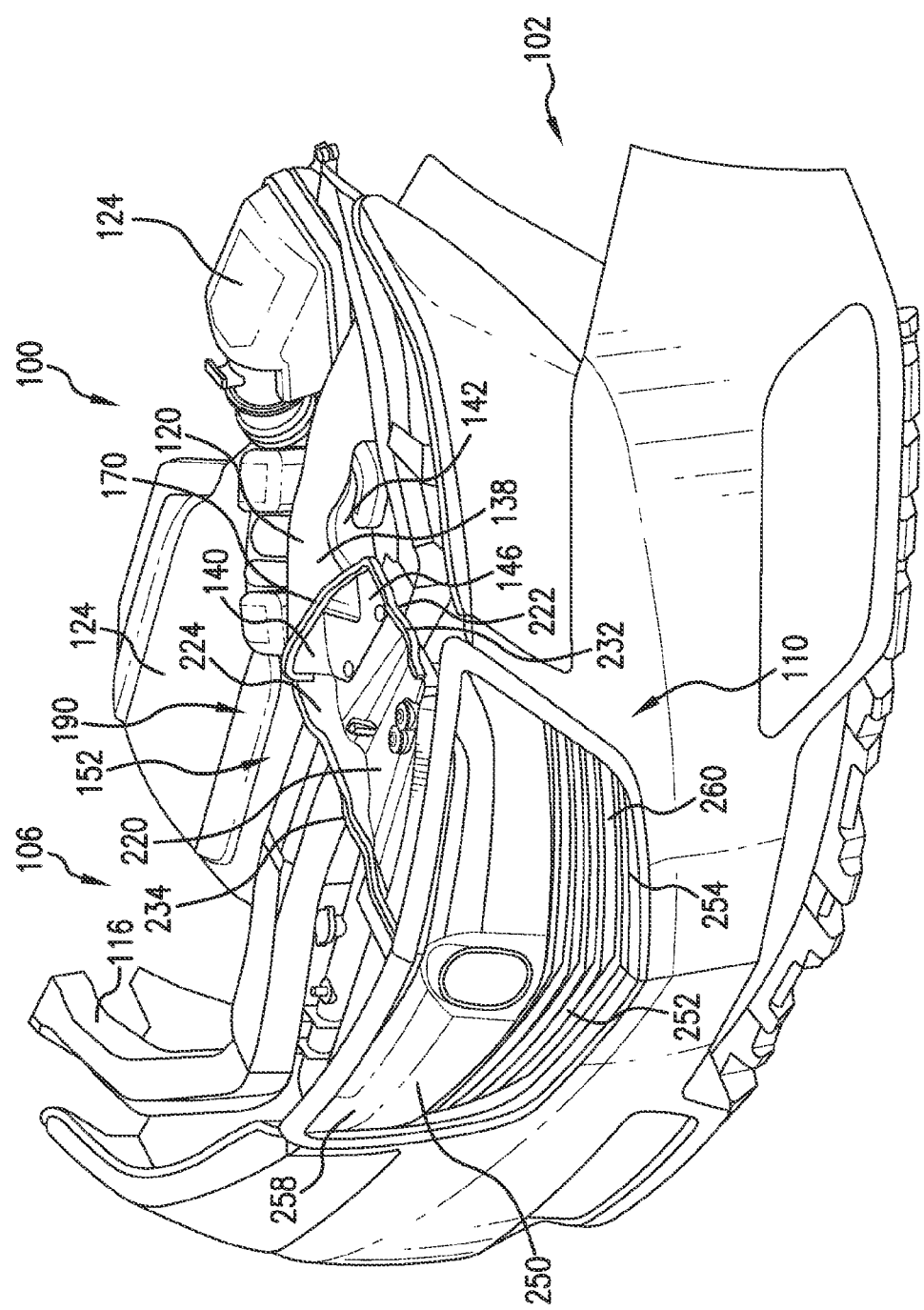
FIG. 1 is a perspective view from an angle of an automobile or vehicle air intake system according to the present disclosure with a hood and a bulkhead cover removed.
Figure 2:
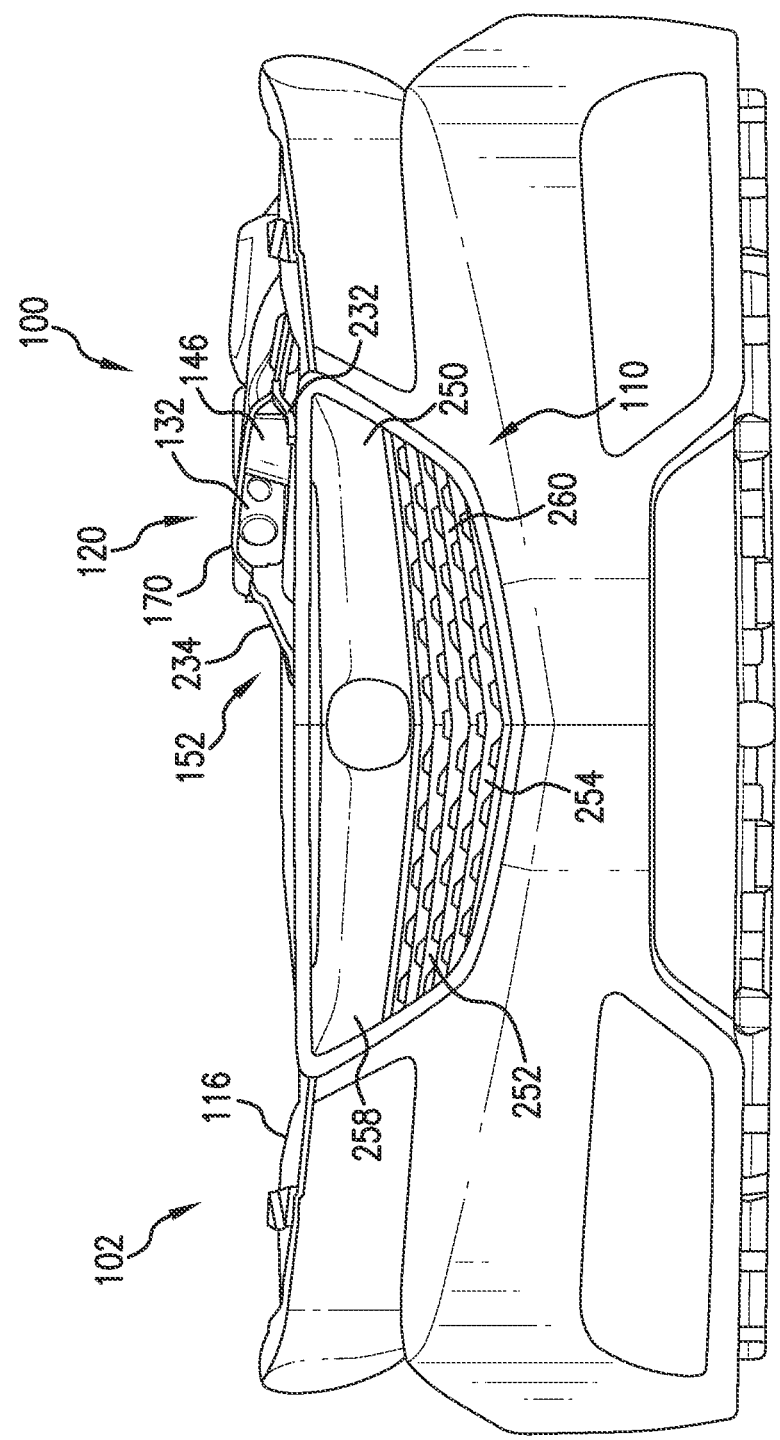
FIG. 2 is a front perspective view of the automobile or vehicle air intake system of FIG. 1.

It should, of course, be understood that the description and drawings herein are merely illustrative and that various modifications and changes can be made in the structures disclosed without departing from the present disclosure. In general, the figures of the exemplary vehicle air intake system are not to scale. It will also be appreciated that the various identified components of the exemplary vehicle air intake system disclosed herein are merely terms of art that may vary from one manufacturer to another and should not be deemed to limit the present disclosure.

Referring now to the drawings, wherein like numerals refer to like parts throughout the several views, FIGS. 1-5 illustrate an air intake system 100 according to the present disclosure as part of an automobile or vehicle 102. The vehicle 102 includes a frame forming boundaries of an engine compartment 106. A hood 108 (FIG. 5) is disposed over the engine compartment and a grille 110 is disposed along a front portion of the engine compartment 106. Further disposed across the front portion of the engine compartment 106 is a transverse frame element, which is commonly referred to as the bulkhead 116. The bulkhead 116 is generally a structural frame member, such as a U-shaped steel bar, that extends laterally across the engine compartment 106 along a top region of the compartment. A bulkhead cover 118 (FIGS. 3 and 5) is disposed in the engine compartment 106 below the hood 108 for covering the bulkhead 116. The air intake system 100 provides cooler air from outside the engine compartment 106 to the automobile engine (not shown) while deterring the ingress of particles and water contained in the air from being drawn into an air intake enclosure 120 of the air intake system 100.

Figure 4:
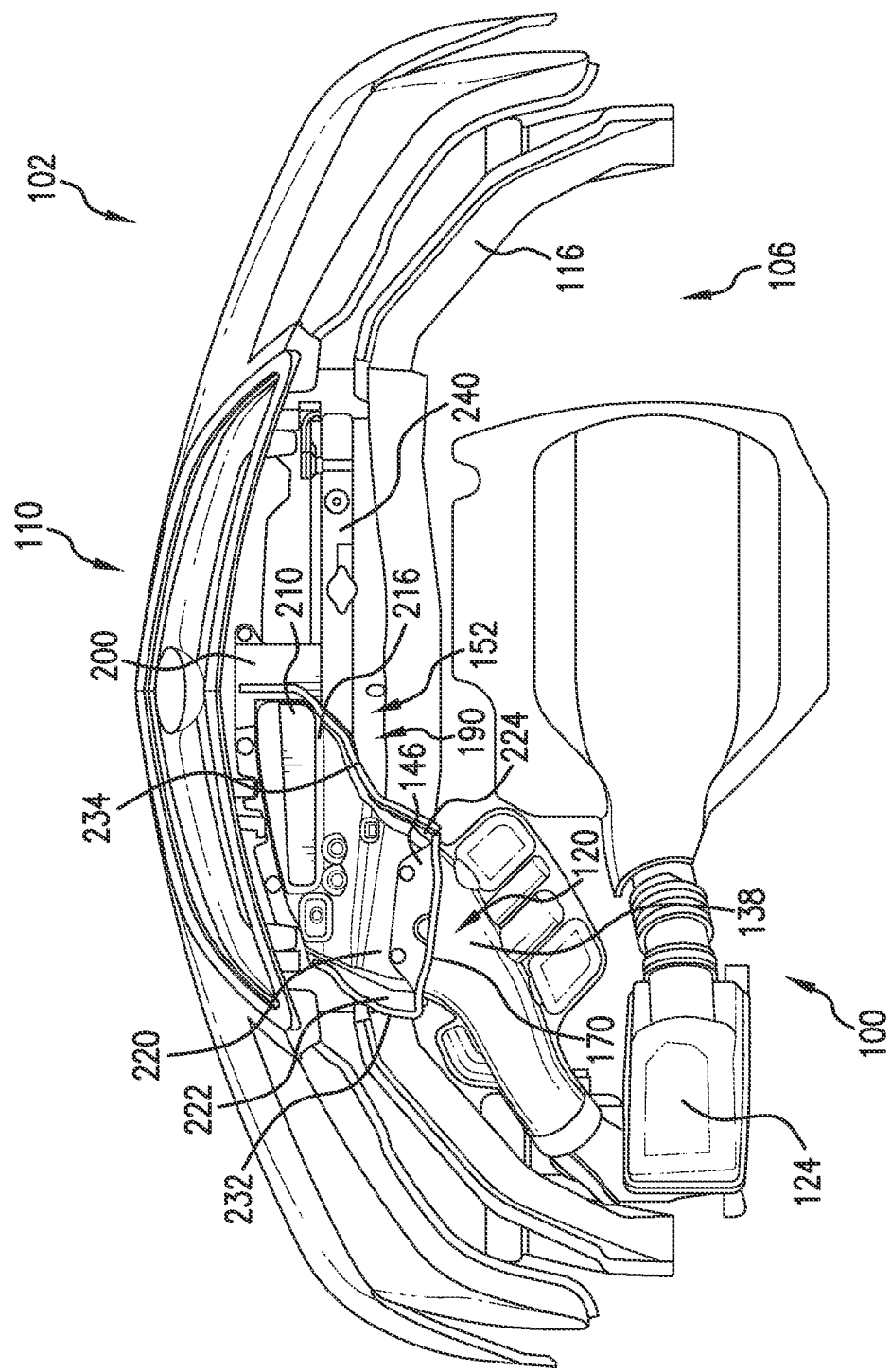
FIG. 4 is a top perspective view of FIG. 3 with an upper part of the bulkhead cover removed.
Figure 5:
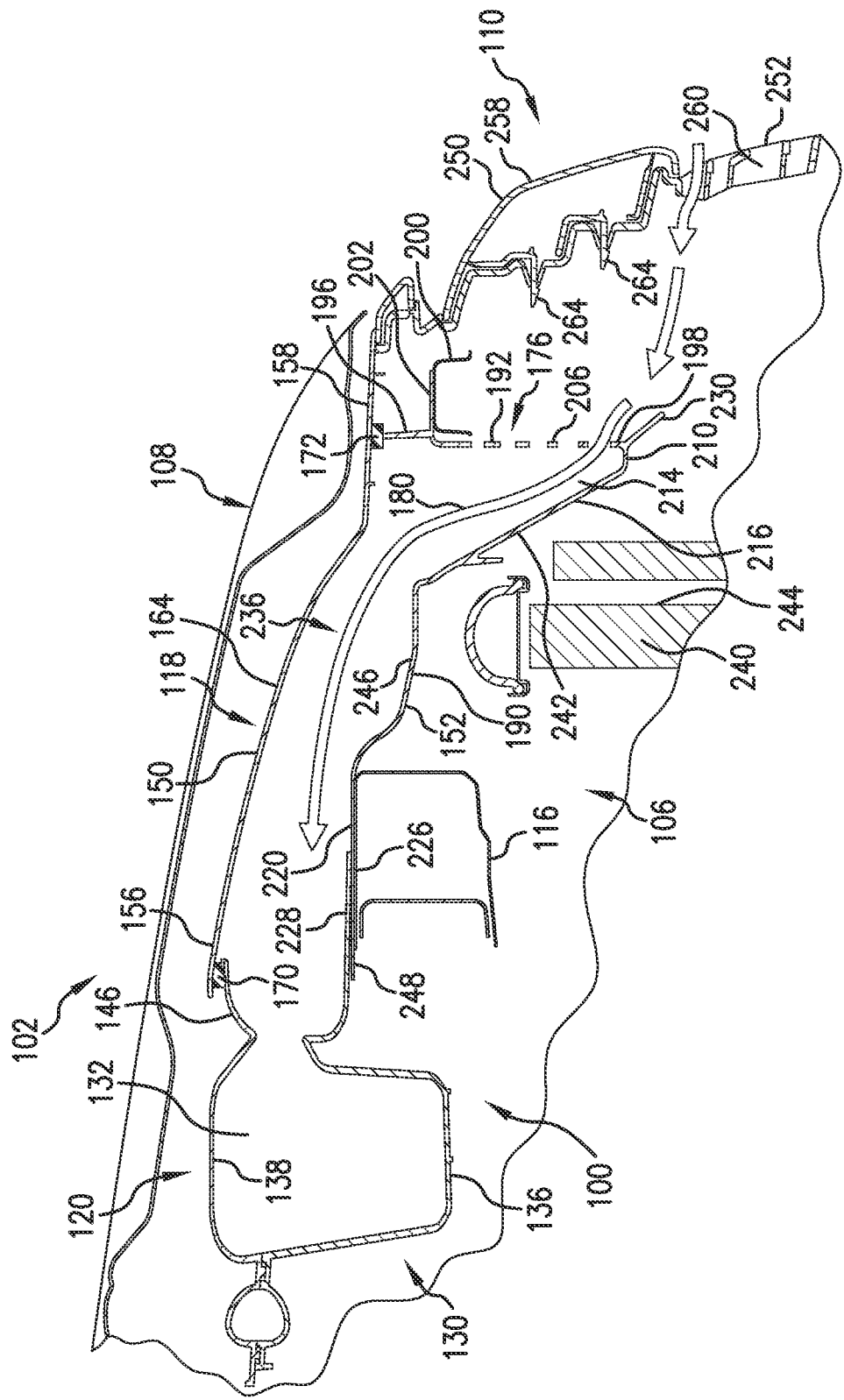
FIG. 5 is a side cross-sectional view of the exemplary vehicle air intake system.

The air intake enclosure 120 is disposed above the bulkhead 116, and can be attached directly to the bulkhead 116, to the bulkhead cover 118, and/or to other structures via hardware such as bolts and/or other common connectors. As shown in FIG. 4, the air intake enclosure 120 provides an air passageway to an air filter unit 124, which further channels filtered air to the automobile engine (not shown). The air intake enclosure 120 generally includes walls 130, which together form a channel 132 for channeling air along an airflow path to air filter unit 124. As best depicted in FIGS. 1 and 5, at a front portion of intake enclosure 120, the walls 130 may include a base 136 opposed by a top 138, and a pair of opposing sidewalls 140 and 142. Front portions of base 136, top 138 and sidewalls 140 and 142 form an intake port 146 generally facing toward the front of vehicle 102. As depicted, the intake port 146 is mounted to the bulkhead 116.

Figure 3:
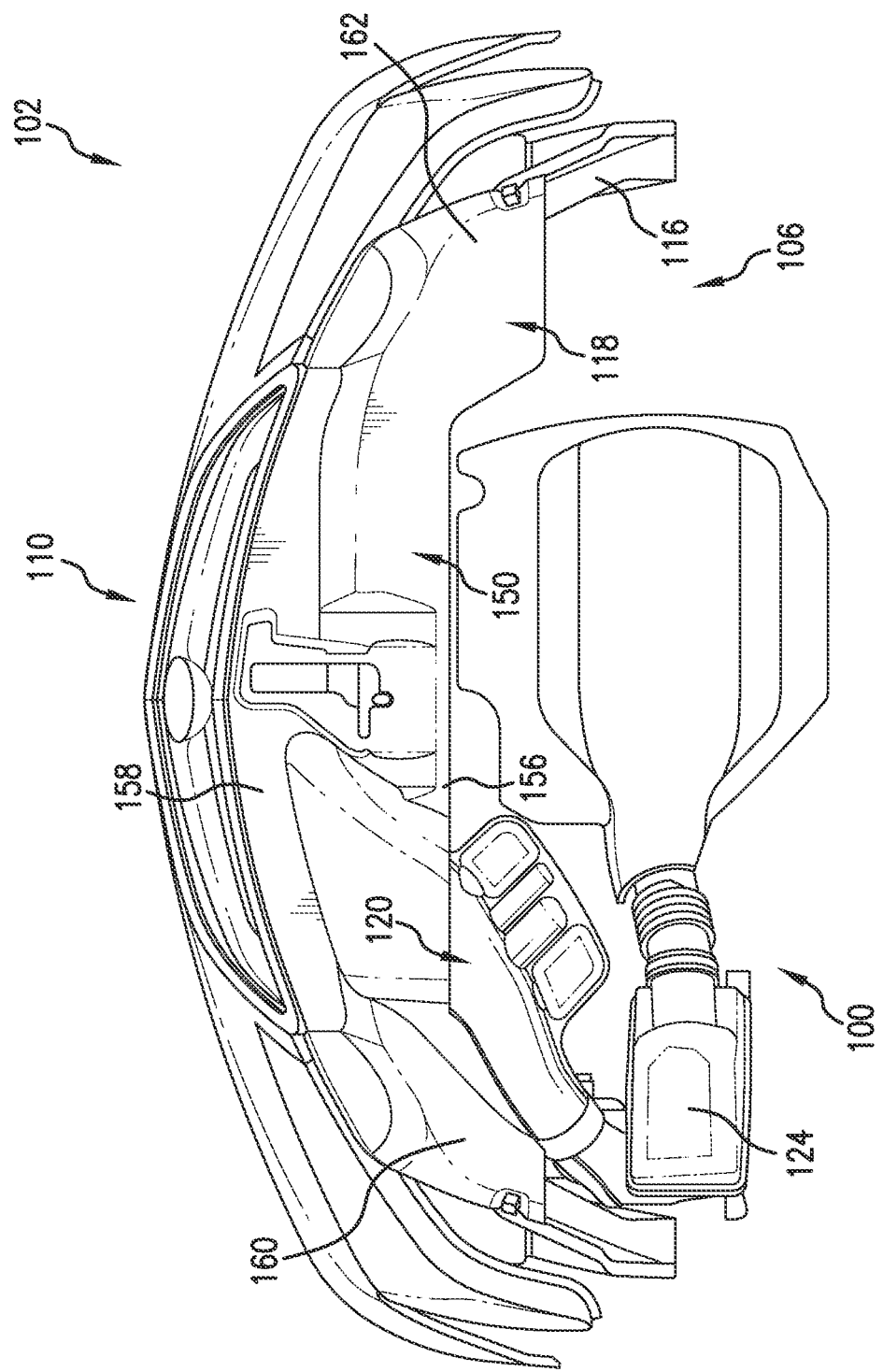
FIG. 3 is a top perspective view of the exemplary vehicle air intake system with the hood removed.

According to the present disclosure, the exemplary bulkhead cover 118 has an upper part 150 and a lower part 152, which is a separate component from the upper part 150. As shown in FIGS. 3 and 5, the upper part 150 of the bulkhead cover 118 is shaped to substantially cover the bulkhead 116 and includes a rear end portion 156, a front end portion 158 and opposing side portions 160 and 162. The rear end portion 156 of the upper part 150 is sealingly engaged to the intake port 146 and the front end portion 158 is sealingly engaged to the lower part 152. With reference to FIG. 3, a section 164 of the upper part 150 extending from the rear end portion 156 toward the front end portion 158 and located between the side portions 160, 162 is shaped to at least partially cover both the intake port 146 of the air intake enclosure 120 and the lower part 152. A rear seal 170 is interposed between a part of the top 138 of the air intake enclosure 120 (i.e., the top of the intake port 146) and a part of the rear end portion 156 defined by the section 164. A front seal 172 is interposed between the front end portion 158 and the lower part 152. Further, the front end portion 158 can be engaged to the grille 110 so as substantially cover the front portion of the engine compartment 106 when the hood 108 is opened. As best depicted in FIG. 5, the upper part 150 and the lower part 152 of the bulkhead cover 118 define a bulkhead cover intake port 176. An airflow path 180 defined by the grille 110 and the bulkhead cover 118 extends from the grille 110 through the bulkhead cover intake port 176 and to the air intake enclosure intake port 146. In the illustrated embodiment, the intake port 176 is forward facing relative to an orientation of the vehicle. In alternate embodiments (not shown), it is to be appreciated that, in addition or in substitution of the intake port 176, one or more other intake ports can be provided (e.g., in sidewalls of the bulkhead cover 118).

The lower part 152 of the bulkhead cover 118 defines an air guide 190 for the air intake system 100. With reference to FIGS. 1, 4 and 5, the air guide 190 includes a forward wall 192 facing the grille 110. The forward wall 192 includes an upper end portion 196 and a lower end portion 198. The upper end portion 196 of the forward wall is at least partially supported on a support member 200 connected or fastened to the grille 110. For example, in the depicted embodiment, the upper end portion 196 can include a ledge 202 that engages an upper wall of the support member 200. Further, the front seal 172 is positioned between the inside of the front end portion 158 of the upper part 150 of the bulkhead cover 118 and the upper end portion 196 of the forward wall 192.

The forward wall 192 can further include a screen 206 through which airflow from the grille 110 passes, though inclusion of a screen (e.g., screen 206) is not required. In the illustrated embodiment, the screen 206 is disposed over or across the intake port 176 of the bulkhead cover and extends transverse to the airflow path 180. According to one aspect, the screen 206 is formed integrally with the forward wall 192. The screen 206 forms an air permeable barrier across the airflow path 180 for inhibiting moisture droplets and/or other particles (e.g., snow) from entering into the air intake enclosure 120 without significantly affecting the flow rate of the incoming air. The screen 206 should have holes that are small enough to screen out most debris, but not too small to significantly restrict airflow. For example, the screen 206 may include holes having an area of about 140 square millimeters, which will prevent the ingress of most debris and permit good airflow therethrough. The moisture droplets and particles may be from water or particles splashed or thrown on the front of vehicle 102, as well as from moisture or particles carried by intake air. The screen 206 provides an initial deflection of these items, which can prevent the air intake system 100 from being clogged or requiring premature replacement of the air filter (not shown). It should be appreciated that the screen 206 (i.e., the forward wall 192) can extend at an angle from horizontal to encourage any particles or moisture collected on screen 206 to travel downward and fall from screen and away from the air intake system 100.

The air guide 190 (i.e., the lower part 152 of the bulkhead cover 118) further includes a plurality of walls and a lower base or base wall 210 that form a front trench portion or a deep intake channel 214. The walls include a rearward wall 216 extending upward from the lower base wall 210 and the forward wall 192 spaced apart from the rearward wall 216 and extending upward from the lower base wall 210 toward the upper part 150. Again, the forward wall 192 has the bulkhead cover intake port 176 defined therein. An upper base or base wall 220 of the air guide 190, which can have a stepped configuration, extends from the rearward wall 216 toward the air intake 146 and opposing sidewalls 222 and 224 extend upwardly from the upper base wall 220. As depicted in FIG. 5, the upper base wall 220 defines a rear end portion 226 of the lower part 152, and the rear end portion 226 is positioned under an extension 228 of the intake port 146 the air intake enclosure 120 and over the bulkhead 116 such that the rear end portion 226 of the lower part 152 is sandwiched between the extension 228 of the air intake enclosure 120 and the bulkhead 116. The lower base wall 210 is offset downwardly and forwardly of the upper base wall 220, with the rearward wall 216 directly interconnecting the lower and upper base walls 210 and 220.

In the illustrated embodiment, an air deflector 230 is cantilevered forward of the forward wall 192 and extends outwardly and downwardly (e.g. obliquely) from a junction of the lower base wall 210 and the forward wall 192 toward the grille 110. The air deflector 230 further inhibits liquid and debris from reaching the bulkhead cover intake port 176. Ribs (not shown) can be provided along the air deflector 230 in laterally spaced apart relation to further inhibit water or other debris from entering the intake port 176. It should be appreciated that the air deflector 230 redirects airflow though the grille 110 toward the bulkhead cover intake port 176. Therefore, the grille 110 and the air deflector 230 further define the airflow path 180 along which the airflow travels vertically to the intake port 146. In an alternate embodiment (not shown), the air deflector 230 can be left out.

Seals 232 and 234 are provided on the respective sidewalls 222 and 224 allowing the inside of the upper part 150 to be sealingly engaged to the sidewalls of the air guide 190. With the sealed arrangement between the upper part 150 and the separate lower part 152 (i.e., the air guide 190) of the bulkhead cover 118, it should be appreciated that the upper part 150 of the bulkhead cover 118 and the air guide 190 (i.e., the lower part 152 of the bulkhead cover 118) define an enclosed airflow passage 236 for receiving airflow flowing through the grille 110 and into the bulkhead cover intake port 176. As shown in FIG. 5, the airflow passage 236 is in direct fluid communication with the intake port 146 thereby channeling airflow into the air intake enclosure 120 to the air filter (not shown) coupled to the enclosure 120. The seals 170, 172, 232, 234 provide a generally airtight flow path 180 extending toward the intake port 146. The seals are preferably made from compressible materials, such as rubber or foam, which can provide tight seals between the inside of upper part 150 and the top of intake air enclosure 120 and lower part 152. Tight seals enhance the effectiveness of air intake system 100 by ensuring the majority of intake air travels via airflow path 180 into intake port 146. Other seals, such as tongue-and-groove configurations or other structures, are also contemplated for generally sealing the upper part 150 of the bulkhead cover 118 to the air intake enclosure 120 and the lower part 152.

With reference to FIG. 5, the air intake system 100 further includes a radiator 240 disposed within the engine compartment 106. In the illustrated embodiment, the radiator 240 is positioned forward of the bulkhead 116, though this is not required. The radiator 240 is further located below the lower part 152 of the bulkhead cover 118 (i.e., the air guide 190), and a front end portion 242 of the lower part 152 extends forwardly and downwardly of the radiator 240. Particular, the rearward wall 216 of the air guide 190 is disposed forwardly of a forward face 244 of the radiator 240 and at least partially covers the forward face 244. The upper base wall 220 of the air guide 190 is located immediately above the radiator 240. As indicated above, the upper base wall 220 can have a stepped configuration, and according to one embodiment, the upper base wall 220 includes a first section 246 and a second section 248 which is offset upwardly and rearwardly of the first section. The radiator 240 is located beneath the first section 246 of the upper base wall 220 and the second section 248 extends beneath the extension 228 of the intake port 146. The rearward wall 216 of the air guide 190 at least partially blocks airflow into the radiator 240. This allows the air deflector 230 to redirect the airflow into the intake port 176 of the bulkhead cover 118. It should be appreciated that the radiator 240 can further form the airflow path 180, or at least a portion thereof, as a vertical airflow path. The radiator 240 at least partially dams airflow through the grille 110 and redirects the airflow straight upward toward the intake port 176. In the illustrated embodiment, the bulkhead cover intake port 176 is disposed forwardly of the radiator 240, and this arrangement directs airflow entering the grille 110 upward around the air deflector 230 and into the intake port 176 of the bulkhead cover 118.

The grille 110 of the illustrated embodiment includes an upper intake portion 250, a central intake portion 252 and a lower intake portion 254. In the shown embodiment, the upper intake portion 250 is blocked by closure member 258 to prevent airflow from entering the grille 110 through the upper intake portion 250 as this would result in a straight-line airflow path from the grille to the intake port 176 of the bulkhead cover 118. Instead, airflow enters the grille through one or more inlet apertures 260 defined at one or both of the grille intake portions 252 and 254. The inlet apertures 260 of the grille intake portions 252 and 254 are disposed below and spaced apart vertically from the air deflector 230 and the intake port 176. This configuration further defines a portion of the airflow path 180 extending from the grille 110 to the intake port 146 of the air intake enclosure 120 as a vertical airflow path. In addition, extensions or protrusions 264 which connect the closure member 258 to the grille 110 can extend inward into the engine compartment 106 to further constrict and redirect the airflow path 180 toward the intake port 176 of the bulkhead cover 118.

With reference back to FIG. 5, air is drawn into air intake enclosure 120 along the airflow path 180. The air flows in from the front of the vehicle 102 through the inlet apertures 260 of the grille 110. When the vehicle 102 is being operated under average driving conditions, air is forced into the front portion of the engine compartment 106 along the airflow path 180 due to forward motion of the vehicle 102. It should be appreciated that the radiator 240 and/or other components of the vehicle partially dam the air, which causes the air pressure to increase in the front portion of the engine compartment, and this encourages the air to flow upward toward the intake port 176 of the bulkhead cover 118. This movement of the air along the airflow path 180 encourages moisture droplets and particles suspended to continue rearward toward the radiator 240 rather than being drawn upward along the airflow path 180. Further, the air intake system 100 provides vacuum via the intake port 146 of air intake enclosure 120 to further encourage air from the front portion of the engine compartment 106 to turn flow upward along the airflow path 180. Once intake air is drawn in through the screen 206 provided at the bulkhead cover intake port 176, the upper part 150 and lower part 152 (i.e., the air guide 190) together channel the air toward the intake port 146 without requiring the hood 108 as a component of the air intake system 100 that defines the airflow path 180 from the grille 110 toward the air intake enclosure 120.

It will be appreciated that the various above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle air intake system, comprising:
a grille disposed along the front portion of an engine compartment;
a hood disposed over the engine compartment;
an air intake enclosure disposed over a bulkhead extending laterally across the engine compartment, the intake enclosure having an intake port;
a bulkhead cover disposed in the engine compartment below the hood for covering the bulkhead, the bulkhead cover having an upper part and a lower part, the upper part being sealingly engaged to both the intake port and the lower part, the lower part defining a bulkhead cover intake port, an airflow path extending from the grille through the bulkhead cover intake port and to the air intake enclosure intake port, the airflow path being defined by the grille and the bulkhead cover,
wherein the lower part of the bulkhead cover includes a forward wall, a front end portion of the upper part being sealingly engaged to the forward wall, and
wherein the forward wall includes a screen which airflow from the grille passes, the screen extending transverse to the airflow path, the screen being configured to inhibit the flow of water and large particles from entering into the bulkhead cover.

2. The air intake system of claim 1, wherein the front end portion of the upper part is further engaged to the grille.

3. The air intake system of claim 1, wherein the forward wall is at least partially supported on a support member connected to the grille.

4. The air intake system of claim 1, wherein the upper part is separate from the lower part.

5. The air intake system of claim 1, wherein a rear end portion of the lower part of the bulkhead cover is positioned under the air intake enclosure and over the bulkhead such that the rear end portion of the lower part is sandwiched between the air intake enclosure and the bulkhead.

6. The air intake system of claim 1, further comprising a radiator disposed within the engine compartment and below the lower part of the bulkhead cover, a front end portion of the lower part extending forwardly and downwardly of the radiator.

7. The air intake system of claim 6, wherein the front end portion of lower part of the bulkhead cover includes the forward wall and an air deflector cantilevered forward of the forward wall.

8. The air intake system of claim 1, wherein the lower part of the bulkhead cover includes a base wall, a rearward wall extending from the base wall, and the forward wall spaced apart from the rearward wall, the forward wall having the bulkhead cover intake port defined therein, and further including an air deflector extending from the forward wall.

9. The air intake system of claim 8, wherein the grille and the air deflector further define the airflow path along which the airflow travels vertically to the intake port of the air intake enclosure.

10. The air intake system of claim 9, wherein the grille has an upper intake portion and a lower intake portion, the upper intake portion is blocked to prevent airflow from entering the grille therethrough, wherein the airflow from the grille enters the lower intake portion through one or more inlet apertures spaced apart vertically below the air deflector.

11. An air intake system for a vehicle, comprising:
a grille disposed along the front portion of the engine compartment and having apertures therein for receiving airflow;
a hood disposed over the engine compartment;
a bulkhead cover received in the engine compartment below the hood for covering a bulkhead extending laterally across the engine compartment;
an air guide separate from the bulkhead cover and located below the bulkhead cover, the bulkhead cover and the air guide defining an enclosed airflow passage for receiving airflow flowing through the apertures of the grille; and
an air intake enclosure disposed over the bulkhead, the air intake enclosure having an intake port in direct fluid communication with the airflow passage,
wherein the air guide includes a first base wall extending over the bulkhead, a second base wall offset downwardly from the first base wall, a rearward wall, and a forward wall spaced apart from the rearward wall and extending upward toward the bulkhead cover, and
wherein the bulkhead cover has a rear end portion sealingly engaged to the air intake enclosure and a front end portion sealingly engaged to the forward wall.

12. The air intake system of claim 11, wherein the forward wall has a bulkhead cover intake port defined therein, and further includes a screen which extends transverse to the airflow path.

13. The air intake system of claim 11, further comprising a radiator disposed within the engine compartment, the rearward wall of the air guide being disposed forwardly of a forward face of the radiator.

14. The air intake system of claim 11, wherein the air guide further includes an air deflector extending outwardly and downwardly from the forward wall toward the grille.

15. The air intake system of claim 11, further comprising a radiator disposed within the engine compartment, and wherein a rear end portion of the air guide is sandwiched between the intake port of the air intake enclosure and the bulkhead and a front end portion of the air guide at least partially covers a forward face of the radiator.

16. A vehicle air intake system, comprising:
a grille disposed along the front portion of an engine compartment;
a hood disposed over the engine compartment;
an air intake enclosure disposed over a bulkhead extending laterally across the engine compartment, the intake enclosure having an intake port;
a bulkhead cover disposed in the engine compartment below the hood for covering the bulkhead, the bulkhead cover having an upper part and a lower part, the upper part being sealingly engaged to both the intake port and the lower part, the lower part defining a bulkhead cover intake port, an airflow path extending from the grille through the bulkhead cover intake port and to the air intake enclosure intake port, the airflow path being defined by the grille and the bulkhead cover,
wherein the lower part of the bulkhead cover includes a base wall, a rearward wall extending from the base wall, and a forward wall spaced apart from the rearward wall, the forward wall having the bulkhead cover intake port defined therein, and further including an air deflector extending from the forward wall.

17. The air intake system of claim 16, wherein the grille and the air deflector further define the airflow path along which the airflow travels vertically to the intake port of the air intake enclosure.

18. The air intake system of claim 17, wherein the grille has an upper intake portion and a lower intake portion, the upper intake portion is blocked to prevent airflow from entering the grille therethrough, wherein the airflow from the grille enters the lower intake portion through one or more inlet apertures spaced apart vertically below the air deflector.

* * * * *